United States Patent
Ueki

(10) Patent No.: US 8,672,304 B2
(45) Date of Patent: Mar. 18, 2014

(54) ANTI-VIBRATION DEVICE

(75) Inventor: Akira Ueki, Kamakura (JP)

(73) Assignee: Bridgestone Corporation, Tokyo (JP)

( * ) Notice: Subject to any disclaimer, the term of this patent is extended or adjusted under 35 U.S.C. 154(b) by 190 days.

(21) Appl. No.: 12/999,827

(22) PCT Filed: Jun. 17, 2009

(86) PCT No.: PCT/JP2009/061012
§ 371 (c)(1),
(2), (4) Date: Mar. 7, 2011

(87) PCT Pub. No.: WO2009/154222
PCT Pub. Date: Dec. 23, 2009

(65) Prior Publication Data
US 2011/0155887 A1    Jun. 30, 2011

(30) Foreign Application Priority Data

Jun. 17, 2008   (JP) ................ P2008-158351

(51) Int. Cl.
   *F16F 5/00*   (2006.01)
(52) U.S. Cl.
   USPC ..................................... 267/140.13
(58) Field of Classification Search
   USPC .............. 267/140.11, 140.12, 140.13, 141, 267/141.2, 292
   See application file for complete search history.

(56) References Cited

U.S. PATENT DOCUMENTS

| | | | |
|---|---|---|---|
| 5,143,358 A * | 9/1992 | Hibi et al. | 267/140.13 |
| 7,070,175 B2 | 7/2006 | Sakata | |
| 7,216,857 B2 | 5/2007 | Yamamoto | |

FOREIGN PATENT DOCUMENTS

| | | |
|---|---|---|
| CN | 1697943 A | 11/2005 |
| CN | 1701189 A | 11/2005 |

(Continued)

OTHER PUBLICATIONS

Power Chemical, "Silicone Oil", Jan. 2006, p. 3.*

(Continued)

*Primary Examiner* — Bradley King
*Assistant Examiner* — Vu Q Nguyen
(74) *Attorney, Agent, or Firm* — Sughrue Mion, PLLC

(57) ABSTRACT

An anti-vibration device includes a tubular first attachment member connected to either a vibration generating section or a vibration receiving section; a second attachment member connected to the other of the vibration generating section and the vibration receiving section; a first rubber elastic body elastically interconnecting the first and second attachment members; a liquid containing a first liquid and a second liquid which are insoluble in each other, the second liquid having a smaller surface tension than the first liquid, and the second liquid in the liquid weighing less than the first liquid in the liquid; a partition member partitioning the inside of the first attachment member into a main liquid chamber and a sub liquid chamber, the main liquid chamber having a first partition wall and having a portion of the liquid enclosed therein, an inner volume of the main liquid chamber changing due to deformation of the first rubber elastic body, a part of the first partition wall being formed of the first rubber elastic body; and the sub liquid chamber having a second partition wall and having a portion of the liquid enclosed therein, at least a part of the second partition wall being adapted to be deformable, the liquid being enclosed in the main liquid chamber and the sub liquid chamber; and an orifice passage provided between the outer peripheral surface of the partition member and the inner peripheral surface of the first attachment member so as to communicate the main liquid chamber and the sub liquid chamber.

4 Claims, 6 Drawing Sheets

(56) References Cited

FOREIGN PATENT DOCUMENTS

| | | | |
|---|---|---|---|
| JP | 57-009340 A | | 1/1982 |
| JP | 57-163747 A | | 10/1982 |
| JP | 60-205041 A | | 10/1985 |
| JP | 4-136534 A | * | 5/1992 |
| JP | 06-221372 A | | 8/1994 |
| JP | 10-252811 A | | 9/1998 |
| JP | 2001-012537 A | | 1/2001 |
| JP | 2003-148548 A | | 5/2003 |

OTHER PUBLICATIONS

MEGlobal, "Ethylene Glycol Product Guide", 2008, p. 7.*
Fisher Scientific, "Dow Corporation DC 200 Silicone Fluid Material Safety Data Sheet", Aug. 1993, p. 1.*
English translation of JP 4-136534 (Suzuki).*
International Search Report for PCT/JP2009/061012 dated Sep. 8, 2009.
Chinese Office Action issued in Application No. 200980123126.5 dated Jul. 11, 2012.

* cited by examiner

ANTI-VIBRATION DEVICE

CROSS REFERENCE TO RELATED APPLICATIONS

This application is a National Stage of International Application No. PCT/JP2009/061012 filed Jun. 17, 2009, claiming priority based on Japanese Patent Application No. JP 2008-158351 filed Jun. 17, 2008, the contents of all of which are incorporated herein by reference in their entirety.

TECHNICAL FIELD

The present invention relates to an anti-vibration device which is applied to, for example, automobiles, industrial machines, or the like, and absorbs and attenuates the vibration of vibration generating sections, such as an engine.

Priority is claimed on Japanese Patent Application No. 2008-158351 filed on Jun. 17, 2008, the contents of which are incorporated herein by reference.

BACKGROUND ART

As this type of anti-vibration device, there is conventionally known an anti-vibration device including a tubular first attachment member connected to either a vibration generating section or a vibration receiving section; a second attachment member connected to the other of the vibration generating section and the vibration receiving section; a first rubber elastic body elastically interconnecting the first and second attachment members; a partition member partitioning the inside of the first attachment member into a main liquid chamber and a sub liquid chamber, and an orifice passage provided between the outer peripheral surface of the partition member and the inner peripheral surface of the first attachment member so as to communicate the main liquid chamber and the sub liquid chamber, in which the liquid is enclosed in the main liquid chamber and the sub liquid chamber, and the main liquid chamber has a first partition wall and has liquid enclosed therein, an inner volume of the main liquid chamber changes due to deformation of the first rubber elastic body, a part of the first partition wall is formed of the first rubber elastic body, the sub liquid chamber has a second partition wall and has liquid enclosed therein, at least a part of the second partition wall is adapted to be deformable.

In this anti-vibration device, conventionally, the main liquid chamber may have a negative pressure, for example, when vibration is input in an opposite direction due to the rebound or the like of the first rubber elastic body after a large vibration (load) is input due to irregularity or the like of a road surface and the fluid pressure of the main liquid chamber rises abruptly. At this time, cavitation by which a number of bubbles are generated in the liquid within the main liquid chamber occurs. Thereafter, when the bubbles disappear out of the liquid as the fluid pressure within the main liquid chamber rises, shock waves are generated, and these shock waves propagate to metallic materials, such as the first attachment member, whereby abnormal noise is generated.

As a means for preventing generation of such abnormal noise, as shown in the following Patent Document 1, there is known a configuration in which a communication hole which allows a main liquid chamber and a sub liquid chamber to communicate with each other is formed in a partition member separately from an orifice passage, a valve is provided in this communication hole, and when the fluid pressure of the main liquid chamber will become a negative pressure after the fluid pressure has risen abruptly, the valve is opened to short-circuit the main liquid chamber and the sub liquid chamber to inhibit the fluid pressure of the main liquid chamber from falling in advance, thereby preventing the cavitation from occurring.

[Patent Document 1] Japanese Unexamined Patent Application, First Publication No. 2003-148548.

DISCLOSURE OF INVENTION

Technical Problem

However, in the conventional anti-vibration device, the communication hole, the valve, and the like are provided. Thus, there is a possibility that not only the configuration becomes complicated, but also that valve is opened unexpectedly to worsen the attenuation performance since the tuning for adjusting the fluid pressure when the valve is opened as mentioned above is difficult.

The invention has been made in consideration of such circumstances and the object thereof is to provide an anti-vibration device capable of reducing the magnitude of abnormal noise generated without complicating the structure and without worsening the attenuation performance.

Technical Solution

In order to solve the above problems, and achieve such an object, an anti-vibration device of one aspect of the present invention includes a tubular first attachment member connected to either a vibration generating section or a vibration receiving section; a second attachment member connected to the other of the vibration generating section and the vibration receiving section; a first rubber elastic body elastically interconnecting the first and second attachment members; a partition member partitioning the inside of the first attachment member into a main liquid chamber and a sub liquid chamber, and an orifice passage provided between the outer peripheral surface of the partition member and the inner peripheral surface of the first attachment member so as to communicate the main liquid chamber and the sub liquid chamber. The liquid is enclosed in the main liquid chamber and the sub liquid chamber, and the main liquid chamber has a first partition wall and has liquid enclosed therein, and an inner volume of the main liquid chamber changes due to deformation of the first rubber elastic body, a part of the first wall is formed of the first rubber elastic body, the sub liquid chamber has a second partition wall and has liquid enclosed therein, at least a part of the second wall is adapted to be deformable. The liquid contains a first liquid and a second liquid which are insoluble in each other, the second liquid has a smaller surface tension than the first liquid, and the weight of the second liquid in the liquid is less than the weight of the first liquid.

In the one aspect of the present invention, the liquid enclosed in the main liquid chamber and the sub liquid chamber contains the first liquid and the second liquid which are insoluble in each other, the amount of the second liquid is less than the amount of the first liquid, and the surface tension of the second liquid is smaller than the surface tension of the first liquid. Thus, when a large vibration (load) is input, a large amount of second liquid which has become granular is dispersed in the first liquid, for example, due to such factors that the liquid passes through a restriction passage, the inner volume of the liquid chambers changes, or cavitation occurs in the liquid.

Thereby, cavitation occurs even in the second liquid as well as the first liquid particularly in the vicinity of an opening of the restriction passage where the flow velocity of the liquid becomes high within the main liquid chamber. As a result, the growth of the bubbles generated in the first liquid is suppressed compared to a case where the liquid does not contain the second liquid. Accordingly, the shock waves resulting from collapse of the cavitation in the first liquid can be minimized. In addition, the above-described state where the first liquid and the second liquid are insoluble in each other is obtained by mixing a polar fluid with a non-polar fluid.

On the other hand, since the second liquid is dispersed in the first liquid as mentioned above, it is possible to prevent the bubbles generated in the second liquid from growing up, and to prevent the contraction velocity of the bubbles at the time of condensation from becoming high, so that the shock waves resulting from collapse of the cavitation of the second liquid can be minimized.

From the forgoing, compared to a case where the liquid does not contain the second liquid but contains only the first liquid, it is possible to minimize the shock waves generated in the whole liquid within the liquid chamber, and the magnitude of abnormal noise generated can be reduced.

Moreover, countless shock waves from individual parts of second liquid dispersed in the first liquid interfere with each other, and the energies of the shock waves are cancelled out. As a result, as mentioned above, the shock waves generated in the second liquid are minimized, and simultaneously, the shock waves from the second liquid can be prevented from propagating to the outside of the anti-vibration device.

In addition, when vibration (load) is subsequently further input repeatedly, the second liquid is uniformly and more finely dispersed over the whole region in the first liquid, and the aforementioned working effects are effectively exhibited.

Moreover, since it is not necessary to add, for example, a new mechanism, such as a valve mechanism, complication of the anti-vibration device can be avoided, and it is possible to reduce the magnitude of abnormal noise generated, without opening a valve to short-circuit the main liquid chamber and the sub liquid chamber unlike the conventional technique. Thus, such working effects are exhibited, while it is possible to prevent an occurrence of worsening the attenuation performance, and the attenuation performance can be stabilized.

Here, the second liquid may have a higher vapor pressure than the vapor pressure of a chief component of the first liquid at the same temperature.

Additionally, since the liquid contains the first liquid and the second liquid which are insoluble in each other and have different vapor pressures at the same temperature, the vapor pressure of the entire liquid becomes higher than the vapor pressure of the first liquid single substance and the vapor pressure of the second liquid single substance.

Accordingly, in the process in which the fluid pressure in the main liquid chamber falls as mentioned above, the fluid pressure at which cavitation begins to occur in the interface region between the first liquid and the second liquid in the liquid becomes higher compared to a case where the first liquid single substance or the second liquid single substance is enclosed in the main liquid chamber and in the sub liquid chamber.

Here, the vapor pressure of the second liquid is higher than the vapor pressure of a chief component of the first liquid. Thus, in the process in which the fluid pressure in the main liquid chamber continues to fall, by causing cavitation preferentially in the second liquid having a higher vapor pressure at the same temperature among the chief components of the first liquid and the second liquid, and by expanding the bubbles produced due to the cavitation, it is possible to prevent the fluid pressure from falling, and to further prevent the aforementioned bubbles from being produced in the chief component of the first liquid.

Additionally, the first liquid may contain ethylene glycol as a single substance, ethylene glycol and propylene glycol, water, or other polar fluids, and the second liquid may contain silicone oil or fluorine oil. In addition, as the above second liquid, phenols, such as a higher alcohols, hexane, benzene, toluene, diethyl ether, chloroform, ethyl acetate, methylene chloride, or phenoxy ethanol, may be used.

Moreover, the liquid may contain 60 wt % or more and 99.9 wt % or less of the first liquid, and contains 0.1 wt % or more and 40 wt % or less of the second liquid.

In these cases, the aforementioned working effects are reliably exhibited without degrading the attenuation performance.

Furthermore, since silicone oil and fluorine oil are more expensive compared to ethylene glycol and propylene glycol, but the weight of the second liquid in the liquid is less than the weight of the first liquid, it is possible to suppress increases in the costs of the anti-vibration device.

Advantageous Effects

According to this invention, the magnitude of abnormal noise generated can be reduced without complicating the structure and without worsening the attenuation performance.

EXPLANATION OF REFERENCE

10: ANTI-VIBRATION DEVICE
11: FIRST ATTACHMENT MEMBER
12: SECOND ATTACHMENT MEMBER
13: FIRST RUBBER ELASTIC BODY
14: MAIN LIQUID CHAMBER
15: SUB LIQUID CHAMBER
16: PARTITION MEMBER
24: ORIFICE PASSAGE
L: LIQUID
O: CENTRAL AXIS

BEST MODE FOR CARRYING OUT THE INVENTION

Figure 1:
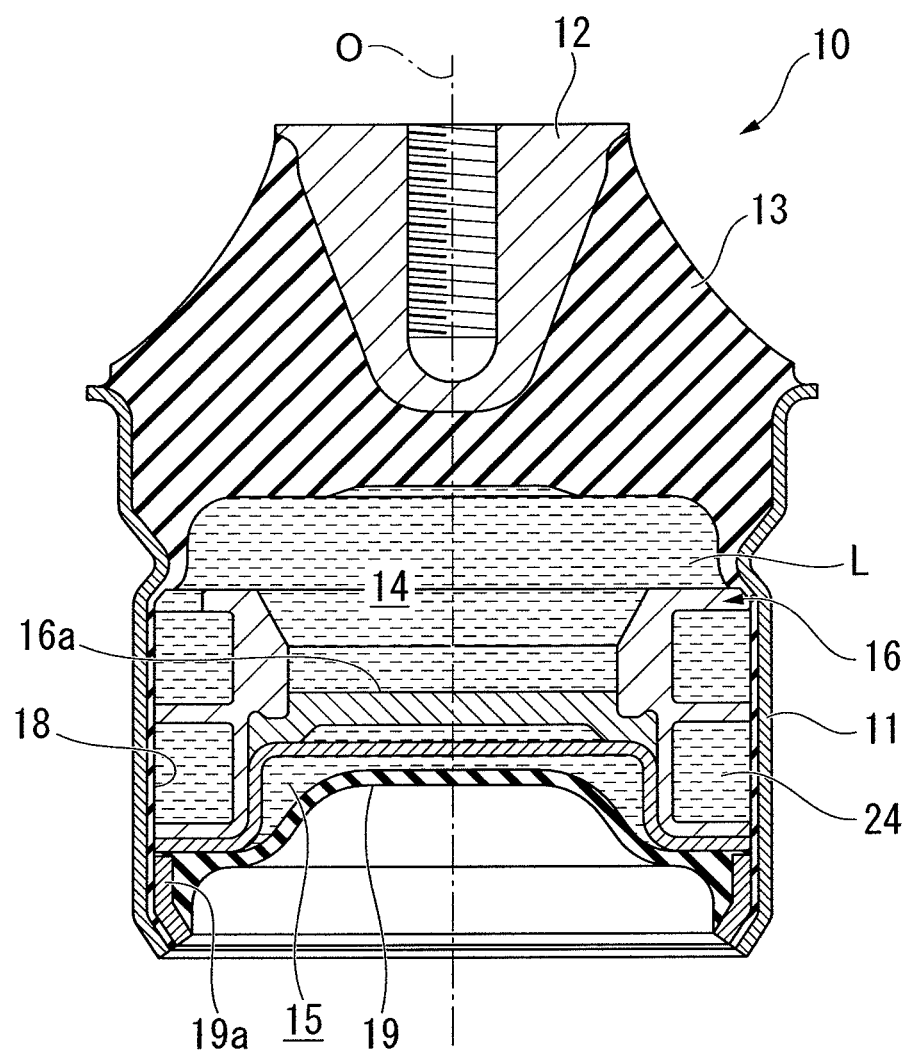
FIG. 1 is a longitudinal sectional view of an anti-vibration device according to an embodiment of the present invention.

Hereinafter, one embodiment of an anti-vibration device according to the present invention will be described, referring to FIG. 1. The anti-vibration device 10 includes a tubular first attachment member 11 connected to either a vibration generating section or a vibration receiving section, a second attachment member 12 connected to the other of the vibration generating section and the vibration receiving section, a first rubber elastic body 13 elastically interconnecting the first and second attachment members 11 and 12, and a partition member 16 partitioning the inside of the first attachment member 11 into a main liquid chamber 14 and a sub liquid chamber 15 which will be described later.

In addition, these respective members are formed in a circular shape or an annular shape in top view, and are arranged coaxially with a common axis. Hereinafter, this common axis is referred to as a central axis O.

In a case where the anti-vibration device 10 is mounted on, for example, an automobile, the second attachment member 12 is connected to an engine serving as a vibration generating section, and the first attachment member 11 is connected to a vehicle body serving as a vibration receiving section via a bracket or the like which is not shown, whereby transmission of vibration of the engine to the vehicle body is suppressed.

The second attachment member 12 is formed in a columnar shape and arranged at a first end opening of the first attachment member 11 in the direction of the central axis O. The first rubber elastic body 13 is bonded to the first end opening of the first attachment member 11 and the outer peripheral surface of the second attachment member 12, and blocks the first attachment member 11 from the first end in the direction of the central axis O. In addition, a first end face of the second attachment member 12 is formed with an internal thread portion. Additionally, an end in the axial direction of the second attachment member 12 projects further outward in the direction of the central axis O than the first end opening face of the first attachment member 11 in the direction of the central axis O.

Moreover, a diaphragm 19 is disposed at a second end opening of the first attachment member 11 in the direction of the central axis O. The diaphragm 19 is an inverted bowl-shaped body which is formed in a circular shape in top view and opens toward the second end in the direction of the central axis O. Additionally, the inner peripheral surface of a ring plate 19a is vulcanized and bonded to the outer peripheral edge of the diaphragm 19 over its entire periphery. As the ring plate 19a fits into the second end opening of the first attachment member 11, the diaphragm 19 blocks the first attachment member 11 from the second end in the direction of the central axis O.

In the above configuration, the portion located between the diaphragm 19 and the first rubber elastic body 13 inside the first attachment member 11 is blocked in a liquid-tight manner by the diaphragm 19 and the first rubber elastic body 13, thereby forming a liquid chamber which is filled with a liquid L which will be described later. The liquid chamber is partitioned by the partition member 16 into a main liquid chamber 14 and a sub liquid chamber 15. The main liquid chamber 14 has a first partition wall, a part of which is formed of the first rubber elastic body 13, and an inner volume thereof changes due to deformation of the first rubber elastic body 13. The sub liquid chamber 15 has a second partition wall, a part of which is formed of the diaphragm 19, and the inner volume thereof changes due to deformation of the diaphragm 19.

Here, an orifice passage 24 which extends along the peripheral direction of the first attachment member 11 is formed between the inner peripheral surface of the first attachment member 11 and the outer peripheral surface of the partition member 16.

In the illustrated example, the partition member 16 is formed in an annular shape, a peripheral groove formed in the outer peripheral surface of the partition member 16 is used as the orifice passage 24, and the orifice passage 24 is blocked by a rubber membrane 18 covered on the inner peripheral surface of the first attachment member 11 from the outside in the radial direction of the partition member 12. In addition, the rubber membrane 18 is formed integrally with the first rubber elastic body 13, and the inner peripheral surface of the first attachment member 11 is covered with the first rubber elastic body 13 and the rubber membrane 18 over its whole region. Additionally, a disc-like rubber member 16a is disposed on the radial inside of the partition member 16, and blocks a radial central portion of the partition member 16 which is formed in an annular shape.

Moreover, in the present embodiment, the anti-vibration device 10 is of a compression type which is attached and used so that the main liquid chamber 14 is located on the upper side in a vertical direction and the sub liquid chamber 15 is located on the lower side in the vertical direction.

In the present embodiment, the liquid L contains a first liquid and a second liquid which are insoluble in each other. The second liquid has a smaller surface tension than the first liquid, and the weight of the second liquid in the liquid L is less than the weight of the first liquid. Additionally, the second liquid has a higher vapor pressure than the vapor pressure of a chief component of the first liquid at the same temperature. In addition, the second liquid has a higher vapor pressure than the vapor pressure of a chief component of the first liquid at the same temperature and has a smaller surface tension than the first liquid, within a temperature range of at least −30° C. or higher and 100° C. or lower. For example, the vapor pressure of the second liquid is twice the vapor pressure or more of a chief component of the first liquid.

The first liquid as described above includes, for example, a liquid containing ethylene glycol and propylene glycol, a mixed solution of ethylene glycol as a single substance or ethylene glycol and water or other polar fluids, or the like. The second liquid may include, for example, silicone oil or fluorine oil. In addition, as the above second liquid, phenols, such as a higher alcohols, hexane, benzene, toluene, diethyl ether, chloroform, ethyl acetate, methylene chloride, or phenoxy ethanol, may be used. Additionally, the liquid L contains 60 wt % or more and 99.9 wt % or less of the first liquid, and contains 0.1 wt % or more and 40 wt % or less of the second liquid. Preferably, the liquid L contains 80 wt % or more and 99 wt % or less of the first liquid, and contains 1 wt % or more and 20 wt % or less of the second liquid. In addition, the second liquid has a lower viscosity than the first liquid. For example, according to the size of the anti-vibration device in the present embodiment, 0.8 g to 40 g of the second liquid is contained in 80 g to 200 g of a mixed solution of the first liquid and the second liquid.

Figure 5:
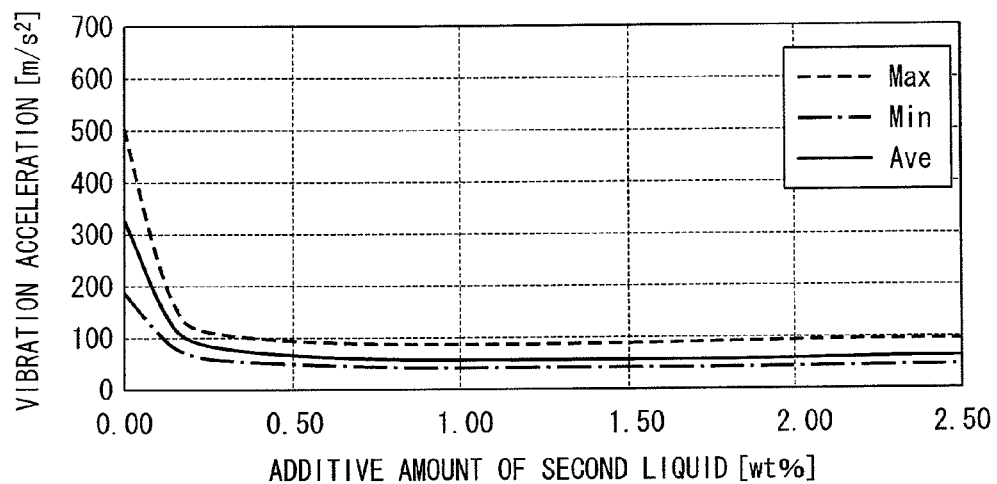
FIG. 5 is a graph showing the correlation between a change in weight % of a second liquid in a liquid and the acceleration which acts on the anti-vibration device according to an embodiment of the present invention, in a case where a different combination ratio of the first liquid and the second liquid is used.
Figure 6:
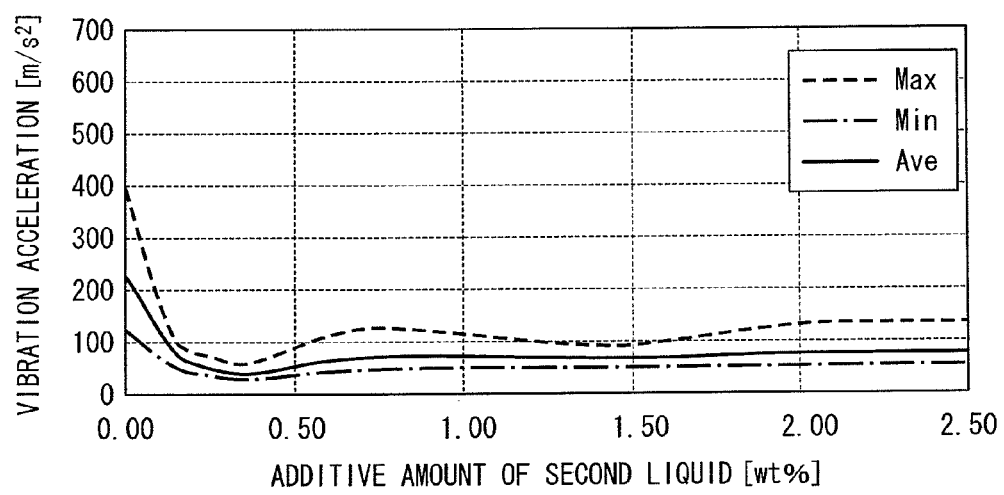
FIG. 6 is a graph showing the correlation between a change in weight % of a second liquid in a liquid and the acceleration which acts on the anti-vibration device according to an embodiment of the present invention, in a case where a different combination ratio of the first liquid and the second liquid is used.
Figure 7:
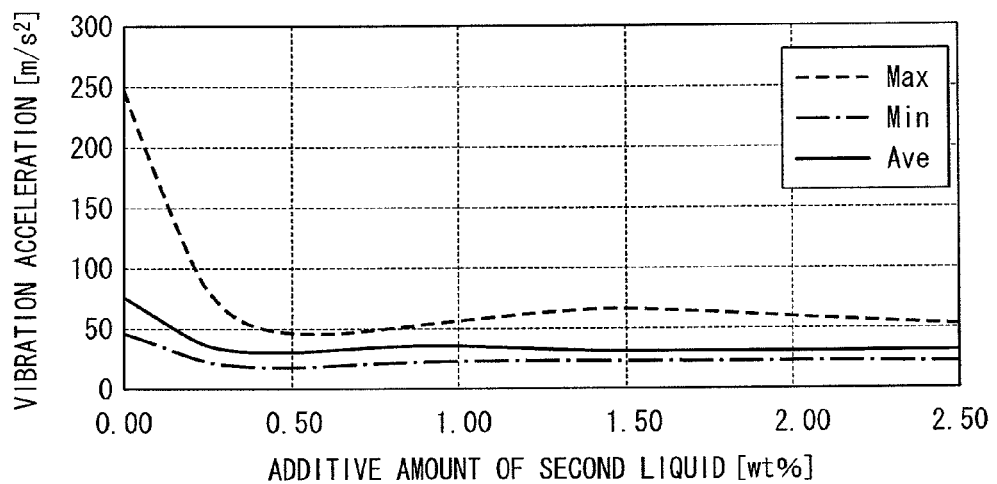
FIG. 7 is a graph showing the correlation between a change in weight % of a second liquid in a liquid and the acceleration which acts on the anti-vibration device according to an embodiment of the present invention, in a case where a different combination ratio of the first liquid and the second liquid is used.
Figure 8:
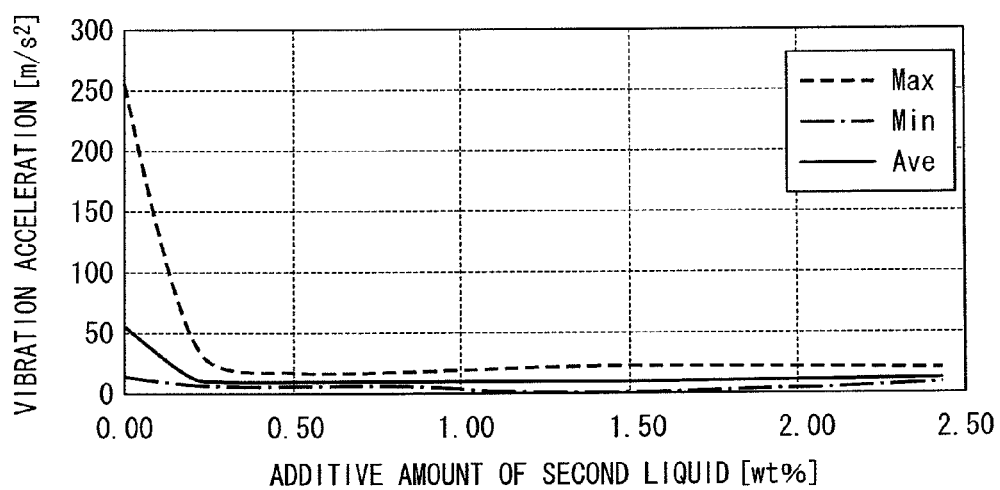
FIG. 8 is a graph showing the correlation between a change in weight % of a second liquid in a liquid and the acceleration which acts on the anti-vibration device according to an embodiment of the present invention, in a case where a different combination ratio of the first liquid and the second liquid is used.
Figure 9:
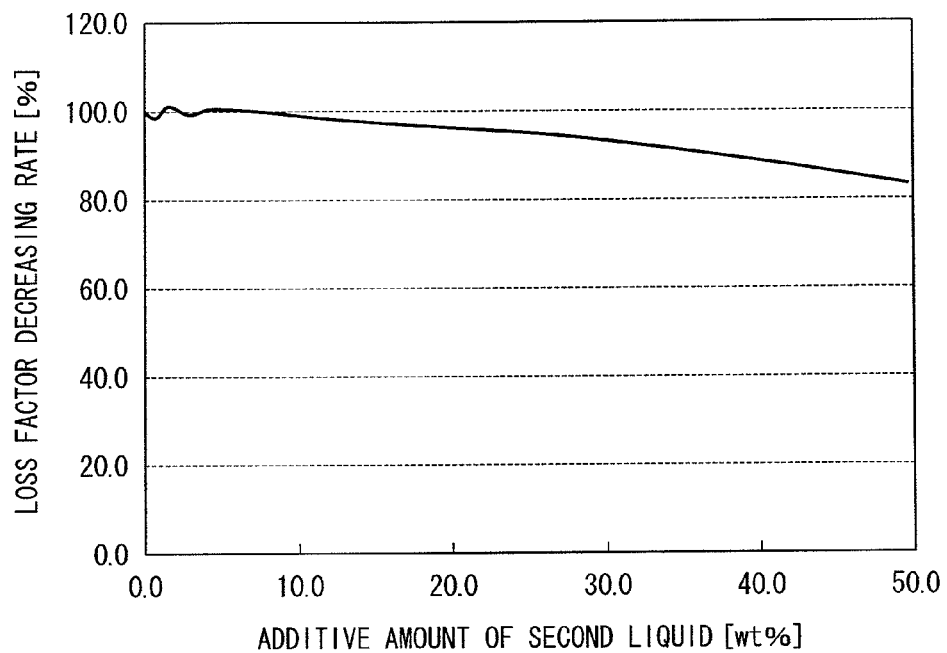
FIG. 9 is a graph showing the correlation between a change in weight % of a second liquid in a liquid and the loss factor decreasing rate of the anti-vibration device according to an embodiment of the present invention, in a case where a different combination ratio of the first liquid and the second liquid is used.
Figure 10:
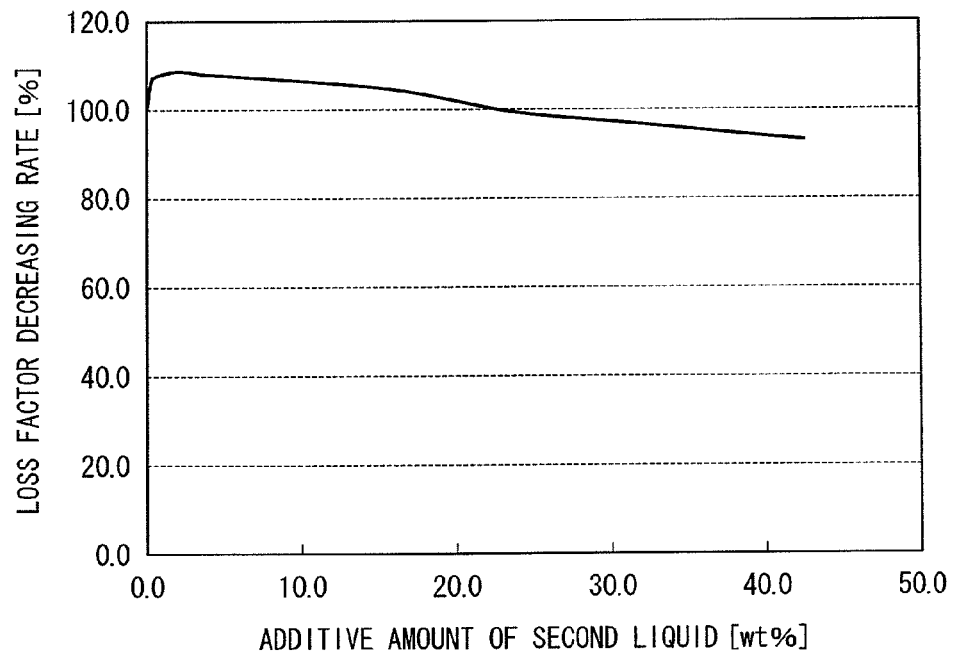
FIG. 10 is a graph showing the correlation between a change in weight % of a second liquid in a liquid and the loss factor decreasing rate of the anti-vibration device according to an embodiment of the present invention, in a case where a different combination ratio of the first liquid and the second liquid is used.

Here, FIGS. 5 to 8 are graphs showing the correlation between a change in weight % of a second liquid in the liquid L and the acceleration (vibration acceleration) which acts on the anti-vibration device in a case where large vibration has been input to the anti-vibration device according to one embodiment of the present invention in a case where a different combination ratio of the first liquid and the second liquid is used. The weight % of the second liquid is shown on the horizontal axis and the acceleration is shown on the vertical axis. FIGS. 9 and 10 are graphs showing the correlation between a change in weight % of a second liquid in the liquid L and loss factor decreasing rate of the anti-vibration device according to one embodiment of the present invention in a case where a different combination ratio of the first liquid and the second liquid is used. The weight % of the second liquid is shown on the horizontal axis and the loss factor decreasing rate is shown on the vertical axis. FIG. 5 shows a case where ethylene glycol is used as the first liquid and fluorine oil (made by Sumitomo 3M; Trade name: NovecHFE7300) is used as the second liquid. FIG. 6 shows a case where ethylene glycol is used as the first liquid and silicone oil is used as the second liquid. FIG. 7 shows a case where a mixed solution of ethylene glycol and propylene glycol is used as the first liquid and fluorine oil (made by Sumitomo 3M; Trade name: NovecHFE7300) is used as the second liquid. FIG. 8 shows a case where a mixed solution of ethylene glycol and propylene glycol is used as the first liquid and silicone oil is used as the second liquid. FIG. 9 shows a case where ethylene glycol is used as the first liquid and fluorine oil (made by Sumitomo 3M; Trade name: NovecHFE7300) is used as the second liquid. FIG. 10 shows a case where ethylene glycol is used as the first liquid and silicone oil is used as the second liquid. It can be seen from FIGS. 5 to 8 that the reduction effect of the acceleration which acts on the above anti-vibration device is exhibited when the amount of the second liquid is 0.1 wt % or more, and the reduction effect of the acceleration which acts on the above anti-vibration device is more markedly exhibited when the amount of the second liquid is 1 wt % or more. Additionally, it can be seen from FIGS. 9 and 10 that the reduction effect of the loss factor decreasing rate of the above anti-vibration device begins to lower when the amount of the second liquid is 20 wt % or more, and the reduction effect of the loss factor decreasing rate of the above anti-vibration device more markedly lowers when the amount of the second liquid is 40 wt % or more. From this, the amount of the first liquid and the second liquid in a preferable weight %, as described above, can be determined.

Moreover, the liquid L takes an aspect in which the second liquid is dispersed in a number of locations in the first liquid in a state where the second liquid is separated from the first liquid when a large vibration (load) is input to the anti-vibration device 10 at least due to irregularity or the like of a road surface.

As described above, according to the anti-vibration device 10 according to the present embodiment, the liquid L enclosed in the main liquid chamber 14 and the sub liquid chamber 15 contains the first liquid and the second liquid which are insoluble in each other. Thus, when a large vibration is input due to irregularity or the like of a road surface and the fluid pressure of the main liquid chamber 14 rises abruptly, and thereafter, the vibration is input in an opposite direction, for example, due to rebound or the like of the first rubber elastic body 13 and the fluid pressure within the main liquid chamber 14 falls, it is possible to generate cavitation on both the first liquid and second liquid in an interface region between the first liquid and the second liquid in the liquid L.

Accordingly, compared to a case where the liquid L does not contain the second liquid, it is possible to inhibit bubbles from being produced in the first liquid, and it is possible to prevent bubbles from being crushed and shock waves from being generated in the first liquid in the process in which the fluid pressure of the main liquid chamber 14 rises and returns to an original fluid pressure.

Here, since the second liquid has a smaller surface tension than the first liquid, the second liquid is easily dispersed in the mixed solution, the shock waves which are generated as the bubbles produced due to cavitation are crushed interfere with each other, and the energy of the shock waves in the second liquid becomes lower than that in the first liquid.

Accordingly, as mentioned above, it is possible to prevent shock waves from being generated in the first liquid, and simultaneously it is possible to lower the energy of the shock waves generated in the whole liquid L. As a result, the magnitude of abnormal noise generated can be reduced.

Moreover, since the weight of the second liquid, which has a smaller surface tension than the first liquid, in the liquid L is less than the first liquid, the aforementioned working effects are exhibited due to the fact that the second liquid easily changes phase compared to the first liquid. Furthermore, it is possible to prevent an occurrence of such problems in which, for example, even at a normal time when idle vibration or shaking vibration is applied, cavitation is apt to occur and a liquid column resonance action produced in the orifice passage 24 is not easily exhibited.

Additionally, since the liquid L contains the first liquid and the second liquid which are insoluble in each other and have different vapor pressures at the same temperature, the vapor pressure of the whole liquid L becomes higher than the vapor pressure of the first liquid single substance, or the vapor pressure of the second liquid single substance.

Accordingly, in the process in which the fluid pressure in the main liquid chamber 14 falls as mentioned above, the fluid pressure at which cavitation begins to occur in the interface region between the first liquid and the second liquid in the liquid L becomes higher compared to a case where the first liquid single substance or the second liquid single substance is enclosed in the main liquid chamber 14 and the sub liquid chamber 15.

Here, the vapor pressure of the second liquid at the same temperature is higher than the vapor pressure of a chief component of the first liquid. Thus, in the process in which the fluid pressure in the main liquid chamber continues to fall, by causing cavitation preferentially in the second liquid having a higher vapor pressure at the same temperature among the chief component of the first liquid and the second liquid, and by expanding the bubbles produced due to the cavitation, it is possible to prevent the fluid pressure from falling, and to further prevent the aforementioned bubbles from being produced in the chief component of the first liquid.

Moreover, since it is not necessary to add, for example, a new mechanism, such as a valve mechanism, complication of the anti-vibration device 10 can be avoided, and it is possible to reduce the magnitude of abnormal noise generated, without opening a valve to short-circuit the main liquid chamber and the sub liquid chamber unlike the conventional technique. Thus, while such working effects are exhibited, it is possible to prevent the attenuation performance from worsening and the attenuation performance can be stabilized.

Additionally, since the first liquid contains ethylene glycol as a single substance, ethylene glycol and propylene glycol, water, or other polar fluids, the second liquid is silicone oil or fluorine oil, and the liquid L contains 60 wt % or more and 99.9 wt % or less of the first liquid and contains 0.1 wt % or more and 40 wt % or less of the second liquid, the aforementioned working effects are reliably exhibited without reducing the attenuation performance. In addition, as the above second liquid, phenols, such as a higher alcohols, hexane, benzene, toluene, diethyl ether, chloroform, ethyl acetate, methylene chloride, or phenoxy ethanol, may be used.

Furthermore, since silicone oil and fluorine oil are more expensive compared to ethylene glycol and propylene glycol, but the weight of the second liquid in the liquid L is less than the weight of the first liquid, it is possible to prevent the costs of the anti-vibration device 10 from increasing.

Moreover, in the present embodiment, the liquid L has an aspect in which the second liquid is dispersed in a number of locations in the first liquid in a state where the second liquid is separated from the first liquid when a large vibration (load) is input to the anti-vibration device 10 at least due to irregularity or the like of a road surface. Thus, it is possible to decentralize the locations where the aforementioned bubbles are produced in the liquid L within the main liquid chamber 14 without being centralized on a predetermined location.

Accordingly, it is possible to decentralize the generation locations of the shock waves in the liquid L within the main liquid chamber 14. As a result, while the shock waves advance in the liquid L and propagate to, for example, a portion formed from a metallic material in the anti-vibration device 10, the energy of the shock waves can be attenuated by making the shock waves interfere with each other.

Thereby, even if the shock waves propagate to the portion formed from a metallic material in the anti-vibration device 10, it is possible to prevent the portion from vibrating, and the magnitude of abnormal noise generated can be more reliably reduced.

Figure 2:
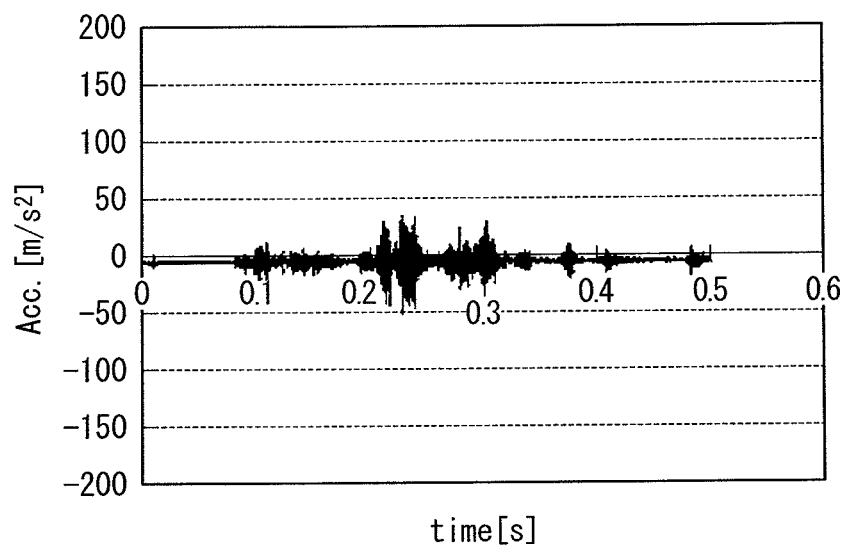
FIG. 2 is a graph obtained by measuring the acceleration which acts on the anti-vibration device in a state where a second liquid is not dispersed in a first liquid, in the anti-vibration device according to an embodiment of the present invention.
Figure 3:
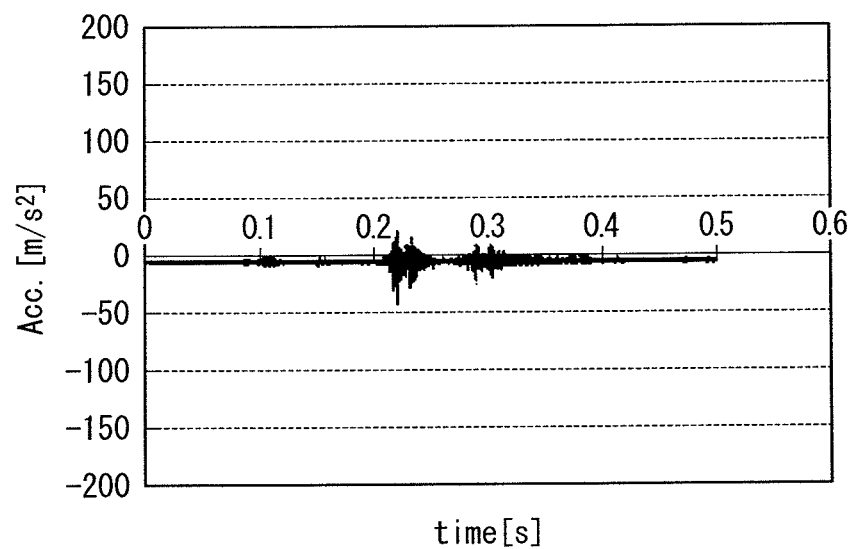
FIG. 3 is a graph obtained by measuring the acceleration which acts on the anti-vibration device in a state where the second liquid is dispersed in the first liquid, in the anti-vibration device according to an embodiment of the present invention.

Here, FIG. 2 is a graph obtained by measuring the acceleration which acts on the anti-vibration device according to one embodiment of the present invention in a case where a large vibration is input to the anti-vibration device in a state where the second liquid is not dispersed in the first liquid, i.e., in a state where the first liquid is separated from the second liquid, with time shown on the horizontal axis and the acceleration shown on the vertical axis. Here, FIG. 3 is a graph obtained by measuring the acceleration which acts on the anti-vibration device according to one embodiment of the present invention in a case where a large vibration similar to the case of FIG. 2 is input to the anti-vibration device in a state where the second liquid is dispersed in the first liquid, with time shown on the horizontal axis and the acceleration shown on the vertical axis. Here, FIG. 4 is a graph obtained by measuring the acceleration which acts on a conventional anti-vibration device in a case where a large vibration similar to the case of FIG. 2 is input to the anti-vibration device, with time shown on the horizontal axis and the acceleration shown on the vertical axis.

In addition, the anti-vibration device in the present embodiment shown in FIGS. 2 and 3 is an embodiment in the case of an anti-vibration device in which 2.5 cc of fluorine oil HFE7300 (boiling point: 98° C. and surface tension: 15.0 mN/m) serving as the second liquid is poured into 197.5 cc of ethylene glycol (boiling point: 197.1° C. and surface tension: 48 mN/m) which is the first liquid, and 200 cc is set as the total liquid volume.

According to the present embodiment as described above, as shown in FIG. 3, it is possible to reduce most of the acceleration which acts on the anti-vibration device in a state where the second liquid is dispersed in the first liquid. That is, the magnitude of abnormal noise generated can be more reliably reduced.

Figure 4:
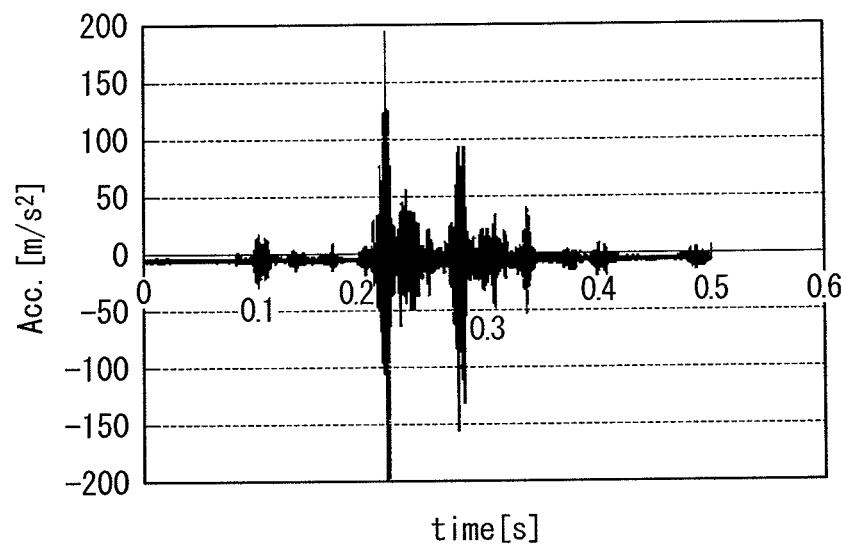
FIG. 4 is a graph obtained by measuring the acceleration which acts on a conventional anti-vibration device.

Additionally, as shown in FIG. 2, it can be seen that, even if the second liquid is not dispersed in the first liquid, the reduction effect of the acceleration which acts on the anti-vibration device is exhibited markedly simply by mixing the second liquid with the first liquid compared to the conventional anti-vibration device shown in FIG. 4.

In addition, it should be understood that the technical scope of the invention is not limited to the above embodiment, but various modifications may be made without departing from the scope of the invention.

For example, the first liquid and the second liquid are not limited to the aforementioned ones, and may be appropriately changed as long as the first and second liquids are liquids of which the kinematic viscosity is comparatively low (equal to or less than $1\times10^{-4}$ m$^2$/s at 25° C.), the boiling point is comparatively high (equal to or higher than 80° C.), and the freezing point is comparatively low (equal to or lower than 0° C.).

Additionally, although a compression type anti-vibration device has been shown as the anti-vibration device 10, the invention can also be applied to a hanging type anti-vibration device which is attached and used so that the main liquid chamber 14 is located on the lower side in the vertical direction and the sub liquid chamber 15 is located on the upper side in the vertical direction.

Moreover, the liquid L is not limited to two kinds of liquids, and may contain three or more kinds of liquids.

Additionally, for example, surfactants, such as an emulsifier, may be mixed in the liquid L. In this case, by assembling the anti-vibration device 10 in the liquid L, and simultaneously with this assembling, by enclosing the liquid L in the main liquid chamber 14 and the sub liquid chamber 15, the anti-vibration device 10 can be manufactured efficiently.

Moreover, generation of abnormal noise may be prevented, for example, by covering the portion, which is located in the main liquid chamber 14 excepting the orifice passage 24 on the surface of the partition member 16, with a rubber membrane or the like.

Additionally, in the above embodiment, as the second liquid, a material having a higher vapor pressure than the vapor pressure of a chief component of the first liquid at the same temperature is described. However, a material having a vapor pressure which is equal to or lower than the magnitude of the vapor pressure of the first liquid at the same temperature may be adopted. The operation and effects in this case can be described as follows.

That is, the liquid enclosed in the main liquid chamber and the sub liquid chamber contains the first liquid and the second liquid which are insoluble in each other, and the amount of the second liquid is less than the amount of the first liquid. Thus, when a large vibration (load) is input, a large amount of second liquid which becomes granular is dispersed in the first liquid, for example, due to such factors that the liquid passes through a restriction passage, the inner volume of the liquid chambers changes, or cavitation occurs in the liquid.

Also, cavitation begins to occur preferentially in the first liquid with a higher vapor pressure among the first liquid and the second liquid particularly in the vicinity of an opening of the restriction passage where the flow velocity of the liquid becomes high within the main liquid chamber. In this case, as the heat of the first liquid which covers the generated bubbles is lost by heat of vaporization and the temperature of the first liquid falls, the vapor pressure of the first liquid falls, and the growth of the bubbles is suppressed. Moreover, when the temperature of the first liquid has fallen more greatly than the temperature of the second liquid, cavitation begins to occur in the second liquid, and thereby, the growth of the bubbles of the first liquid is suppressed. In addition, this effect can be more markedly exhibited by choosing the second liquid whose evaporative latent heat is smaller than the evaporative latent heat of the first liquid. In this case, since the second liquid is dispersed in the first liquid as mentioned above, it is possible to prevent the bubbles in the second liquid from growing bigger. Accordingly, it is possible to prevent the contraction velocity of the bubbles at the time of condensation from becoming high, so that the shock waves resulting from collapse of cavitation in the second liquid can be minimized.

From the forgoing, it is possible to minimize the shock waves generated in the whole liquid within the liquid chamber, and the magnitude of abnormal noise generated can be reduced.

Moreover, countless shock waves from individual parts of second liquid dispersed in the first liquid interfere with each other, and the energies of the shock waves are cancelled out. As a result, as mentioned above, the shock waves generated in the second liquid are minimized, and simultaneously, the shock waves from the second liquid can be prevented from propagating to the outside of the anti-vibration device.

In addition, when vibration (load) is further input repeatedly, the second liquid is uniformly and more finely dispersed over the whole region in the first liquid, and the aforementioned working effects are effectively exhibited.

Industrial Applicability

The magnitude of abnormal noise generated can be reduced without complicating the structure and without worsening the attenuation performance.

The invention claimed is:

1. An anti-vibration device comprising:
a tubular first attachment member connected to at least one of a vibration generating section and a vibration receiving section;
a second attachment member connected to the other of the vibration generating section and the vibration receiving section;
a first rubber elastic body elastically interconnecting the first and second attachment members;
a liquid containing a first liquid and a second liquid which are insoluble in each other, the second liquid having a smaller surface tension than the first liquid, and
the second liquid in the liquid weighing less than the first liquid in the liquid;
a partition member partitioning the inside of the first attachment member into a main liquid chamber and a sub liquid chamber,
the main liquid chamber having a first partition wall and having a portion of the liquid enclosed therein,
an inner volume of the main liquid chamber changing due to deformation of the first rubber elastic body,
a part of the first partition wall being formed of the first rubber elastic body; and
the sub liquid chamber having a second partition wall and having a portion of the liquid enclosed therein,
at least a part of the second partition wall being adapted to be deformable,
the liquid being enclosed in the main liquid chamber and the sub liquid chamber; and
an orifice passage provided between the outer peripheral surface of the partition member and the inner peripheral surface of the first attachment member so as to communicate the main liquid chamber and the sub liquid chamber,
wherein the second liquid is configured to become granular and to be dispersed in the first liquid, when receiving a vibration, and
wherein the liquid contains 80 to 99 wt % of the first liquid, and contains 1 to 20 wt % of the second liquid.

2. The anti-vibration device according to claim 1,
wherein the second liquid has a higher vapor pressure than the vapor pressure of a chief component of the first liquid.

3. The anti-vibration device according to claim 1,
wherein the first liquid contains ethylene glycol as a single substance, or ethylene glycol and propylene glycol, and the second liquid contains silicone oil or fluorine oil.

4. The anti-vibration device according to claim 1,
wherein the liquid contains 60 wt % or more and 99.9 wt % or less of the first liquid and contains 0.1 wt % or more and 40 wt % or less of the second liquid.

* * * * *